United States Patent
Movsesian et al.

(10) Patent No.: US 11,279,461 B2
(45) Date of Patent: Mar. 22, 2022

(54) FLIGHT DECK BARRIER DOOR, AIRCRAFT COMPRISING FLIGHT DECK BARRIER DOOR, AND METHOD OF USING FLIGHT DECK BARRIER DOOR

(71) Applicant: The Boeing Company, Chicago, IL (US)

(72) Inventors: Sami Movsesian, Glendale, CA (US); Mark J. Lebrecht, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 15/611,155

(22) Filed: Jun. 1, 2017

(65) Prior Publication Data

US 2018/0346091 A1    Dec. 6, 2018

(51) Int. Cl.
  *B64C 1/14* (2006.01)
  *B64D 45/00* (2006.01)
  *B64C 1/00* (2006.01)

(52) U.S. Cl.
  CPC .......... *B64C 1/1469* (2013.01); *B64C 1/1461* (2013.01); *B64D 45/0028* (2019.08); *B64C 2001/009* (2013.01)

(58) Field of Classification Search
  CPC ............ B64C 1/1469; B64C 2001/009; B64D 45/0015
  See application file for complete search history.

(56) References Cited

U.S. PATENT DOCUMENTS

| | | | |
|---|---|---|---|
| 4,989,808 A * | 2/1991 | Spraggins | B64C 1/1407 244/118.5 |
| 6,607,221 B1 * | 8/2003 | Elliott | E05B 65/0876 292/33 |
| 6,702,230 B2 * | 3/2004 | Movsesian | B64C 1/1469 244/118.5 |
| 6,871,821 B2 | 3/2005 | Takahama | |
| 7,309,044 B2 * | 12/2007 | Sprenger | B64D 45/0026 244/118.5 |
| 7,578,477 B2 | 8/2009 | French et al. | |
| 7,600,716 B2 | 10/2009 | French et al. | |
| 8,651,924 B1 * | 2/2014 | Jones | B64D 13/02 244/118.5 |
| 9,233,747 B2 | 1/2016 | Perkins et al. | |
| 9,487,297 B2 * | 11/2016 | Long | B64D 11/02 |
| 9,499,251 B2 | 11/2016 | Perkins et al. | |
| 9,566,759 B2 | 2/2017 | Perkins et al. | |
| D817,851 S * | 5/2018 | Perkins | D12/345 |
| 2003/0052227 A1 * | 3/2003 | Pittman | B64D 45/0015 244/118.5 |
| 2003/0189130 A1 * | 10/2003 | Dovey | B64C 1/1469 244/118.5 |
| 2004/0068936 A1 * | 4/2004 | Amin-Javaheri | E06B 7/084 49/74.1 |
| 2004/0144895 A1 | 7/2004 | Takahama | |
| 2004/0149858 A1 * | 8/2004 | Marshall | B64D 45/0015 244/118.5 |

(Continued)

*Primary Examiner* — Nicholas McFall
(74) *Attorney, Agent, or Firm* — Walters & Wasylyna LLC

(57) ABSTRACT

A flight deck barrier door for an aircraft, the flight deck barrier door including a door frame and a door panel in the door frame. The door panel has a plurality of vents. The door panel and door frame have a minimum total vented surface area of 1000 square inches.

20 Claims, 13 Drawing Sheets

(56) References Cited

U.S. PATENT DOCUMENTS

2004/0239126 A1* 12/2004 Pratt ................. B64C 1/1469
                                                292/227
2008/0092630 A1*  4/2008 Piorkowski .......... G01N 7/00
                                                73/31.04
2012/0211601 A1*  8/2012 Pujol ................ B64C 1/1469
                                                244/118.5

* cited by examiner though it would be described here for the ease of understanding and convenience of reading, it may be applied to other types of aircraft such as passenger aircraft or the like.

FLIGHT DECK BARRIER DOOR, AIRCRAFT COMPRISING FLIGHT DECK BARRIER DOOR, AND METHOD OF USING FLIGHT DECK BARRIER DOOR

FIELD

This application relates to flight deck barrier doors, aircraft comprising flight deck barrier doors, and methods of using flight deck barrier doors.

BACKGROUND

Flight deck doors have long been used for passenger aircraft. Since the 1960s, doors between passenger and pilot compartments with a lock were commonly used to prevent passengers from entering a pilot compartment without the pilot's permission. After the attacks of Sep. 11, 2001, measures were taken to increase the security of aircraft cockpits for passenger aircraft. These measures included increasing the security of doors separating the cockpit of the aircraft from its cabin. According to these standards, the door must form a barrier preventing intrusion into the cockpit and entry into the cockpit must be limited to authorized personnel.

Freighters do not have the same requirements for securing their cockpits. However, there is an increasing desire to secure cockpits of freighters from unauthorized entry during flights and during non-flight time periods, particularly for freighters having limited cabin compartments.

SUMMARY

In one embodiment, the disclosed flight deck barrier door for an aircraft may include a door frame and a door panel in the door frame, the door panel having a plurality of vents, wherein the flight deck barrier door has a minimum total vented surface area of 1000 square inches.

In another embodiment, the disclosed aircraft may include a flight deck compartment, a cabin compartment aft of the flight deck compartment, a passageway for passing between the flight deck compartment and the cabin compartment, and a flight deck barrier door in the passageway, the flight deck barrier door having a minimum total vented surface area of 1000 square inches.

In yet another embodiment, the disclosed method for using a flight deck barrier door may include providing a flight deck barrier door to a passageway between a flight deck compartment and a cabin compartment of an aircraft, the flight deck barrier door having a minimum total vented surface area of 1000 square inches. The method may further include providing a flight deck door access system for controlling access to opening of the flight deck barrier door, providing a pressure sensor for detecting a depressurization event, and enabling, by the flight deck door access system, the flight deck barrier door to open upon detecting a depressurization event by the pressure sensor.

Other embodiments of the disclosed flight deck barrier door, aircraft, and method for using a flight deck barrier door will become apparent from the following detailed description, the accompanying drawings and the appended claims.

DETAILED DESCRIPTION

Figure 1:
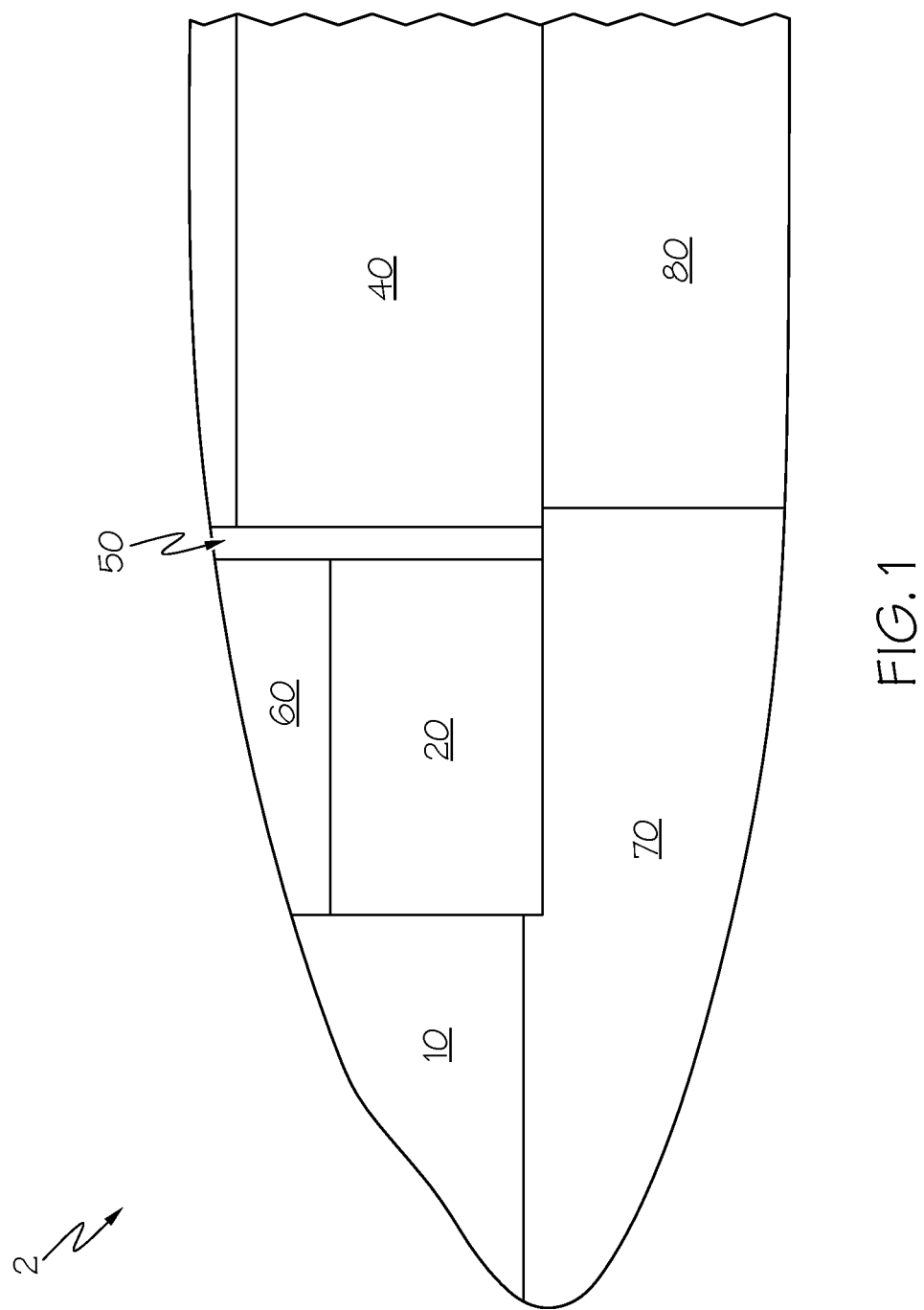
FIG. 1 is a schematic sectional elevational view of a forward portion of an exemplary aircraft in accordance with one embodiment of the present disclosure.
Figure 2:
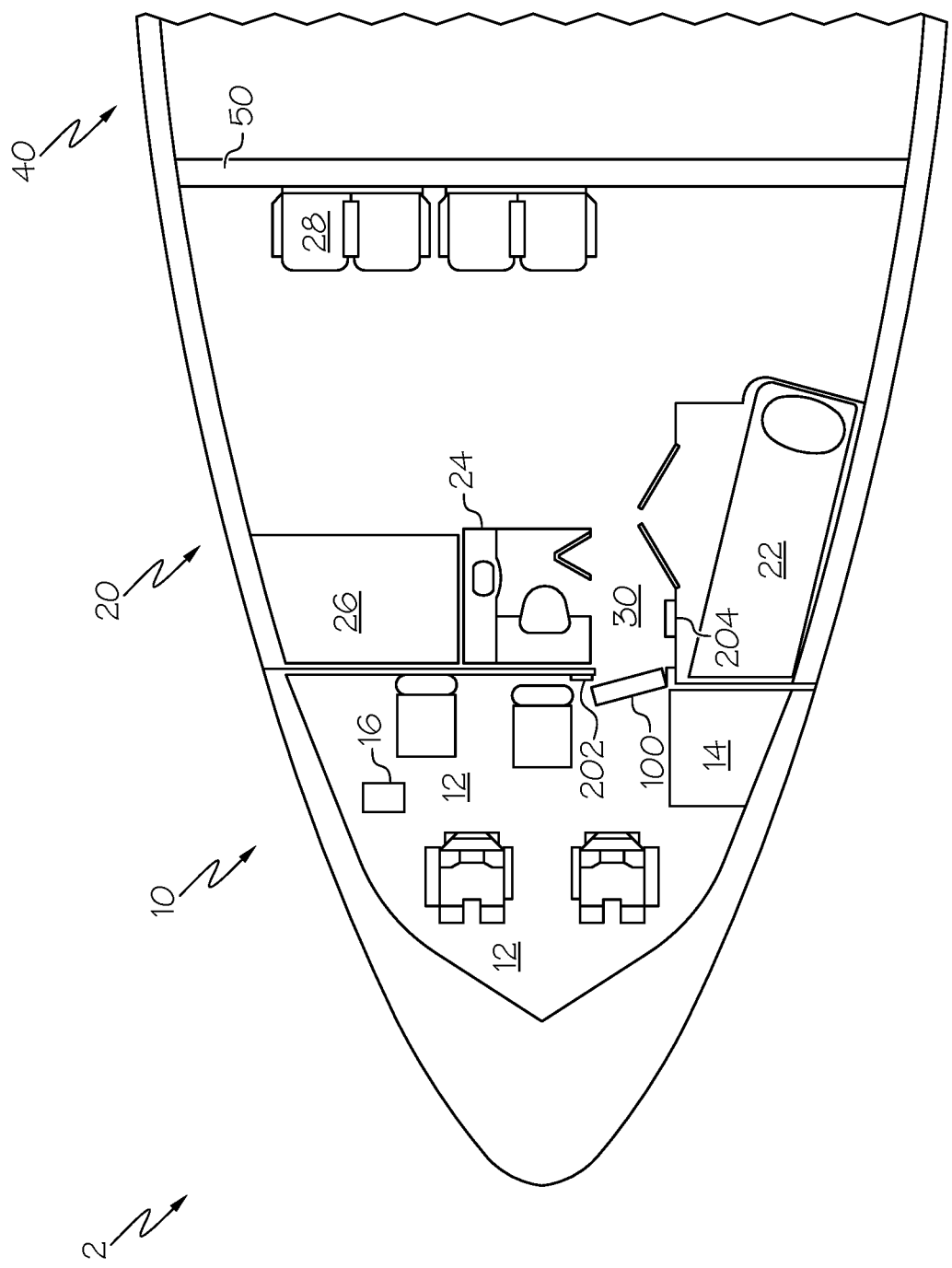
FIG. 2 is a schematic plan view of a forward portion of the aircraft of FIG. 1, which includes a flight deck compartment, a cabin compartment, a passageway therebetween, and a flight deck barrier door.

Referring to FIGS. 1 and 2, an aircraft 2 according to one embodiment of the present disclosure includes a flight deck compartment 10 at a front of the aircraft 2. The flight deck compartment 10 of the aircraft 2 may include, for example, one or more seats 12, monument 14, and a pressure sensor 16. The seats 12 may include pilot and co-pilot seats at the front of the flight deck compartment 10 as well as auxiliary seats at the rear of the flight deck compartment 10. Monument 14 may include a customized or standardized structure. For example, the monument 14 as illustrated in FIG. 2 may be a flight deck closet. The pressure sensor 16 may function to detect a depressurization event. The flight deck compartment 10 may further contain various instruments and controls used by the pilot and co-pilot to operate the aircraft 2.

The aircraft 2 further includes a cabin compartment 20 aft of the flight deck compartment 10. In FIGS. 1 and 2, the aircraft 2 is represented by a cargo-carrying freighter having few seats outside of the flight deck compartment 10, and the cabin compartment 20 may be referred to as a supernumerary compartment. However, the aircraft 2 is not limited to a cargo-carrying freighter, and the cabin compartment 20 is not limited to a supernumerary compartment having few seats outside of the flight deck compartment 10.

The cabin compartment 20 may further include a crew rest area 22, a lavatory 24, a galley 26, and seats 28. The crew rest area 22 may include one or more bunks and a changing area. The lavatory 24 may include a toilet and a sink. The galley 26 may include facilities for storing and/or preparing food. As illustrated in FIG. 2, the crew rest area 22, the lavatory 24, and the galley 26 each share a common wall with the flight deck compartment 10. The seats 28 may include, for example, a plurality of business-class seats.

The aircraft 2 further includes a passageway 30 for passing between the flight deck compartment 10 and the cabin compartment 20. In FIG. 2, the passageway 30 is illustrated as being positioned within the cabin compartment 20 and defined by exterior walls of the crew rest area 22 and lavatory 24. However, various locations and configurations of the passageway 30 may be used without departing from the scope of the present disclosure. In particular, the passageway 30 is not limited to its illustrated location within the cabin compartment 20 or to being defined by opposing exterior walls of the crew rest area 22 and the lavatory 24.

The aircraft 2 may further include a cargo compartment 40, which may be separated from the cabin compartment by a cargo barrier 50. The cargo barrier 50 may be a rigid cargo barrier. Although not shown, a cargo barrier 50 may include an access door and a decompression panel.

The aircraft 2 may further include an overhead cabin compartment 60 above cabin compartment 20, an equipment compartment 70 below the flight deck compartment 10, and a lower lobe compartment 80 below the cargo compartment 40 and aft of the equipment compartment 70.

Referring to FIGS. 1 and 2, the aircraft 2 is illustrated as a cargo-carrying freighter having a particular arrangement and size of compartments. However, various cargo and non-cargo aircraft having various configurations may be used without departing from the scope of the present disclosure.

Referring to FIG. 2, the aircraft 2 further includes a flight deck barrier door 100 in the passageway 30. Returning to the schematic plan view of the aircraft of FIG. 2, the flight deck barrier door 100 is represented in the end of the passageway 30 of the aircraft 2 leading from the cabin compartment 20 to the flight deck compartment 10.

The flight deck barrier door 100 may have a minimum total vented surface area to provide an airflow pathway between the flight deck compartment 10 and cabin compartment 20 to mitigate decompression pressure loads in the forward body in case of a decompression event. Ensuring an adequate airflow pathway between the flight deck compartment 10 and cabin compartment 20 may permit for less reinforcement requirements for major forward structural items, such as a wall separating the flight deck compartment 10 and cabin compartment 20. Avoiding decompression pressures on major forward structural items, such as a wall separating the flight deck compartment 10 and cabin compartment 20, may be particularly important if the major forward structural items include flight deck electrical components thereon or therein. Additionally, ensuring an adequate airflow pathway between the flight deck compartment 10 and cabin compartment 20 may permit for lowering strengthening requirements for other structures positioned between the flight deck compartment 10 and cabin compartment 20. For example, referring to FIG. 2, ensuring an adequate airflow pathway between the flight deck compartment 10 and cabin compartment 20 lowers strengthening requirements for the lavatory 24 and galley 26. In one embodiment, the flight deck barrier door 100 may have a minimum total vented surface area of 1000 square inches, preferably 1200 square inches. In one example, the flight deck barrier door 100 may have a total vented surface area of 1200 to 1500 square inches. In another example, the flight deck barrier door 100 may have a total vented surface area of 1200 to 1400 square inches.

The flight deck barrier door 100 having a minimum total vented surface area may also simplify smoke detection and solutions for suppressing fire and smoke penetration. For example, separate smoke detection may not be necessary in both the flight deck compartment 10 and cabin compartment 20 if the minimum total vented surface area is met. Also, conventional solutions for suppressing fire and smoke penetration would need testing and possible modification if airflow assumptions are modified. Avoiding separate smoke detection and design modifications for suppressing fire and smoke penetration that would be imposed by using an unvented or inadequately vented flight deck barrier door may be important, for example, when the flight deck barrier door is provided as a retrofitted add-on to a previously designed aircraft in which no flight deck barrier door is available or when the flight deck barrier door is provided as an optional add-on to a newly designed aircraft.

The flight deck barrier door 100 may include a door frame and a door panel in the door frame, examples of which are illustrated in subsequent figures. The door panel may have a plurality of vents. The plurality of vents may provide for the minimum total vented surface area of the flight deck barrier door 100. Alternatively, the plurality of vents may provide for a portion of the minimum total vented surface area of the flight deck barrier door 100 and a remaining portion of the minimum total vented surface area may be provided in door frame. Thus, the door frame may optionally include one or more vents.

The plurality of vents in the door panel may be defined by a plurality of slats of the door panel. The plurality of slats may provide sufficient strength to prevent an unauthorized person from forcibly entering the flight deck compartment 10 from the cabin compartment 20, such as by attempting to kick down or kick through the flight deck barrier door 100. The arrangement, size, and shape of the plurality of slats are not limited, except to provide for a sufficient barrier against forcible entry.

The door frame of the flight deck barrier door 100 may be fixedly connected within the passageway at only one end of the door frame. The connection for fixedly connecting the door frame within the passageway is not limited. For example, the connection may include a fixture of the door frame that is fastened to an adjacent structure of the aircraft with one or more fasteners. The end of the door frame that may be fixedly connected may include a top end, a bottom end, a left end or a right end of the door frame. Fixedly connecting the door frame at only one end of the door frame may minimize or eliminate aircraft structural loads imposed by the flight deck barrier door 100. Minimizing or eliminating aircraft structural loads imposed by the flight deck barrier door 100 may be important, for example, where the flight deck barrier door 100 is provided as a retrofitted add-on to a previously designed aircraft in which no flight deck barrier door is available or where the flight deck barrier door 100 is provided as an optional add-on to a newly designed aircraft. In one example, the lower end of the door frame may be fixed connected to the floor of the aircraft 2.

The door frame of the flight deck barrier door 100 may be connected within the passageway at a second end of the door frame by a connection that permits at least one degree of freedom of movement. Connecting a second end of the door frame may contribute to preventing an unauthorized person from forcibly entering the flight deck compartment 10 from the cabin compartment 20, such as by attempting to kick down or kick through the flight deck barrier door 100. However, if the connection at the second end of the door frame is a fixed connection, then the flight deck barrier door 100 may impose undesirable aircraft structural loads. Therefore, permitting at least one degree of freedom of movement may minimizing or eliminating aircraft structural loads imposed by the flight deck barrier door 100. It is understood that the number of degrees of freedom of movement required to minimize or eliminate aircraft structural loads may be dictated by additional factors, such as the design of the aircraft 2 or the positioning or arrangement of the flight deck barrier door 100 within the aircraft 2. For example, an exemplary connection may permit at least two degrees of freedom of movement. In another example, an exemplary connection may permit at least three degrees of freedom of movement. It will be understood that a single connection may provide one or more degrees of freedom of movement, or a connection may include two sub-connections each providing one or more degrees of freedom of movement. For example, a slip pin having a circular cross-section may provide two degrees of freedom of movement, i.e., axial freedom of movement and rotational freedom of movement, whereas a slip pin having a non-circular cross-section may provide one degree of freedom of movement, axial freedom of movement. Either of these floating pins may be combined with another connector, as described and illustrated further below to provide for a combined connector having a higher degree of freedom of movement.

The end of the door frame that is connected with at least one degree of freedom of movement may be opposite to the end that is fixedly connected, or the end of the door frame that is connected with at least one degree of freedom of movement may be an end that is adjacent to the end that is fixedly connected. For example, the door frame of the flight deck barrier door may be fixedly connected at a bottom edge of the door frame and connected at left and right edge of the door frame by connections that permit at least one degree of freedom of movement. As previously explained, connecting a second end of the door frame may contribute to preventing an unauthorized person from forcibly entering the flight deck compartment 10 from the cabin compartment 20, such as by attempting to kick down or kick through the flight deck barrier door 100. Therefore, selection and positioning of the second end to be connected with at least one degree of freedom of movement may account for the need to ensure that the flight deck barrier door 100 prevents an unauthorized person from forcibly entering the flight deck compartment 10. In one example, the upper end of the of the door frame is connected to a ceiling of the aircraft.

The flight deck barrier door 100 may include a door handle 120, such as door knob. The door handle 120 may be permit a person inside of the flight deck barrier door 100 to immediately open the flight deck barrier door 100. In one embodiment, the door panel may have a vented surface area at regions proximate to the door handle that is less than a vented surface area at regions further away from the door handle. For example, a number of slats defining a plurality of vents may be higher at regions proximate to the door handle than at regions further away from the door handle, or a width of slats defining a plurality of vents may be higher at regions proximate to the door handle than at regions further away from the door handle. Ensuring a less vented surface area at regions proximate to the door handle may prevent an unauthorized person in the cabin compartment 20 from accessing the interior door handle located on the side of the flight deck barrier door 100 that faces the flight deck compartment 10.

The aircraft 2 may further include a flight deck door access system, which may include a control system 202 positioned forward of the flight deck barrier door 100 and a console 204 positioned aft of the flight deck barrier door 100. The control system 202 may include a sound-producing device, such as a chime, and may include override device, such as a shut-off switch. The console 204 may include an input device, such as a keypad.

The flight deck door access system controls access to opening of the flight deck barrier door 100. From outside of the flight deck barrier door 100, a user activities the console 204, which is positioned aft of the flight deck barrier door 100, by, for example, pressing an entry code on a keypad. After a pre-determined time, such as 0, 5, 10, 15 second fixed delay, the control system 202 may enable the flight deck barrier door 100 to open, and a user may open and enter the flight deck compartment 10. Thus, the console 204 provides for an emergency means to enable cabin compartment 20 occupants to enter the flight deck compartment 10 in the event that the flight crew becomes incapacitated.

To notify the flight crew of an attempted entry, the control system 202 may include a chime or other sound producing device. To prevent unauthorized entry, an attempted entry from outside of the flight deck barrier door 100 may be overridden by the flight crew by activating an override switch, such as a shut-off switch. From inside the flight deck compartment 10, the flight crew may directly enter the cabin compartment 20 from the flight deck compartment 10 without delay. From the inside of the flight deck barrier door 100, a person may turn the door handle 120 and the flight deck barrier door 100 may open immediately. Also, in the event of a decompression, the flight deck door access system may permit access to opening of the flight deck barrier door 100. For example, the flight deck door access system may permit access to opening of the flight deck barrier door 100 if a depressurization event is detected by pressure sensor 16.

Figure 3:
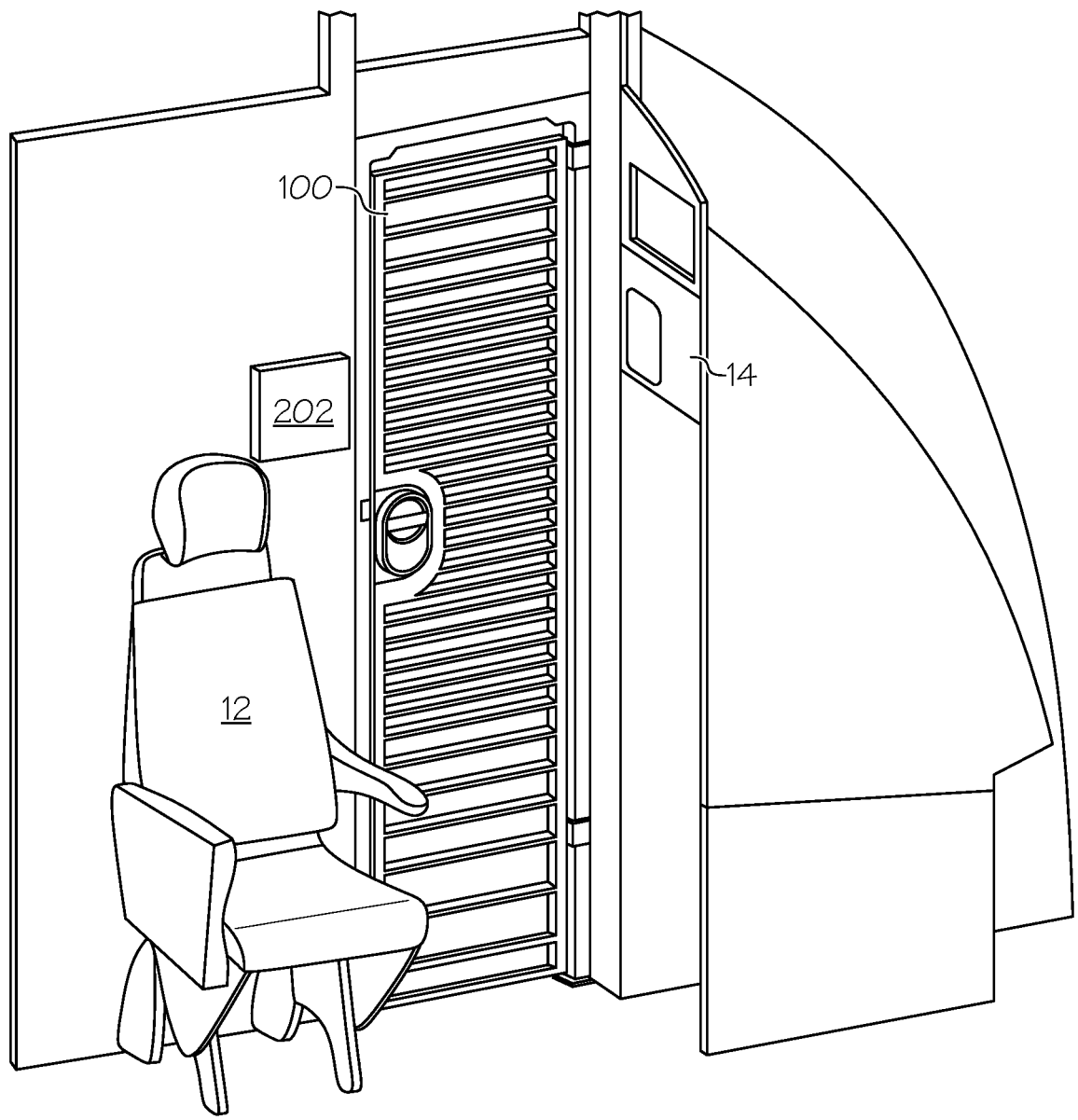
FIG. 3 is a perspective view from the flight deck compartment showing a flight deck barrier door after installation in a closed position in accordance with an embodiment of the present disclosure.
Figure 4:
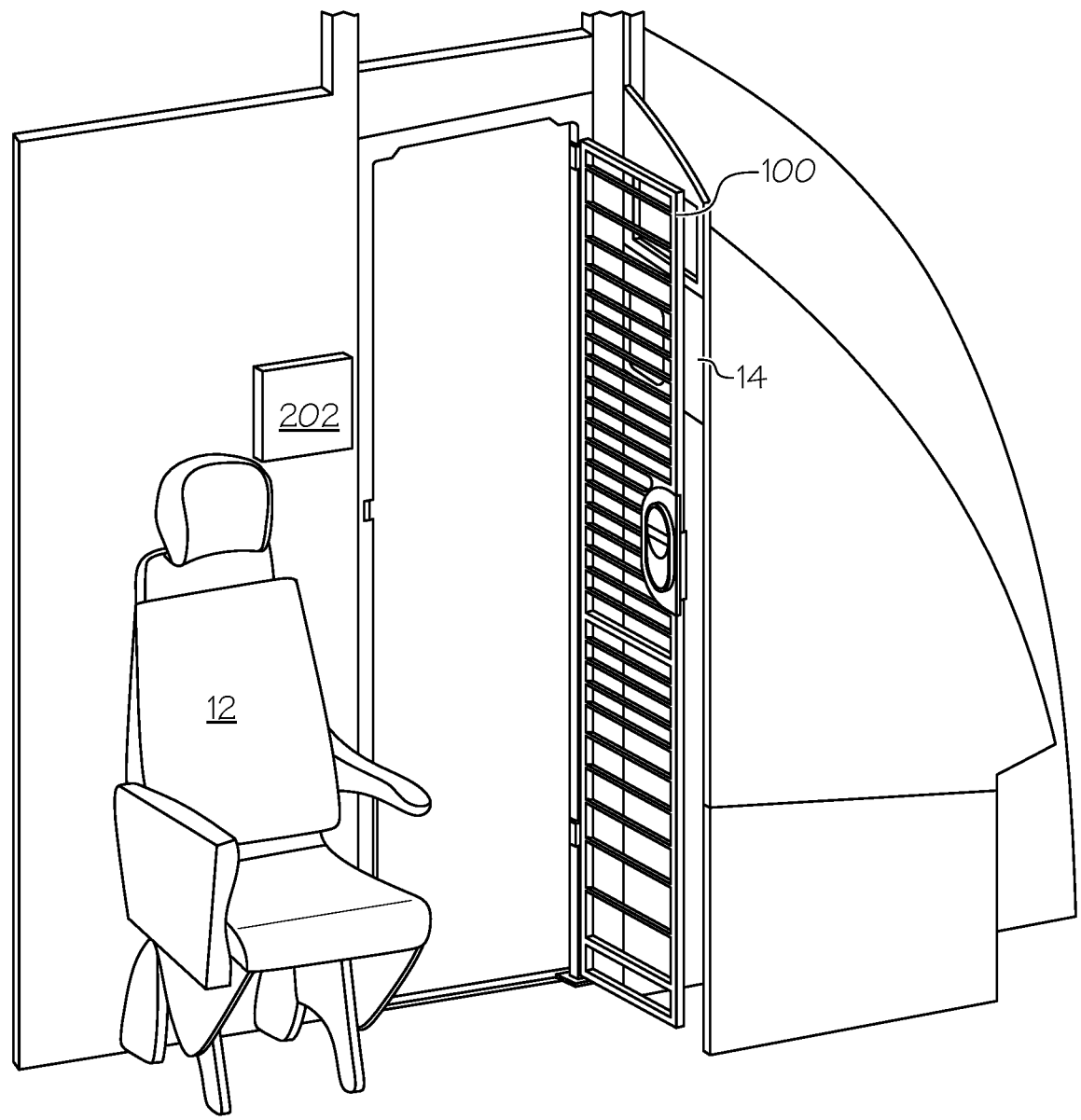
FIG. 4 is a perspective view from the flight deck compartment showing the flight deck barrier door of FIG. 3 in an open position.

Referring to FIGS. 3 and 4, a flight deck barrier door 100 after installation is shown from the perspective of the flight deck compartment, in which the flight deck barrier door 100 is shown in closed and open positions, respectively. Further illustrated is seat 12 adjacent to the flight deck barrier door 100, monument 14 (e.g., flight deck closet), and control system 202 of the flight deck door access system. As illustrated, the flight deck barrier door 100 may swing in a forward direction towards the flight deck compartment 10, and the flight deck barrier door 100 may be secured in an open position against monument 14. Thus, the flight deck barrier door 100 can be stowed during, for example, taxi, takeoff, and landing to permit immediate egress between the flight deck compartment 10 and cabin compartment 20.

Figure 5:
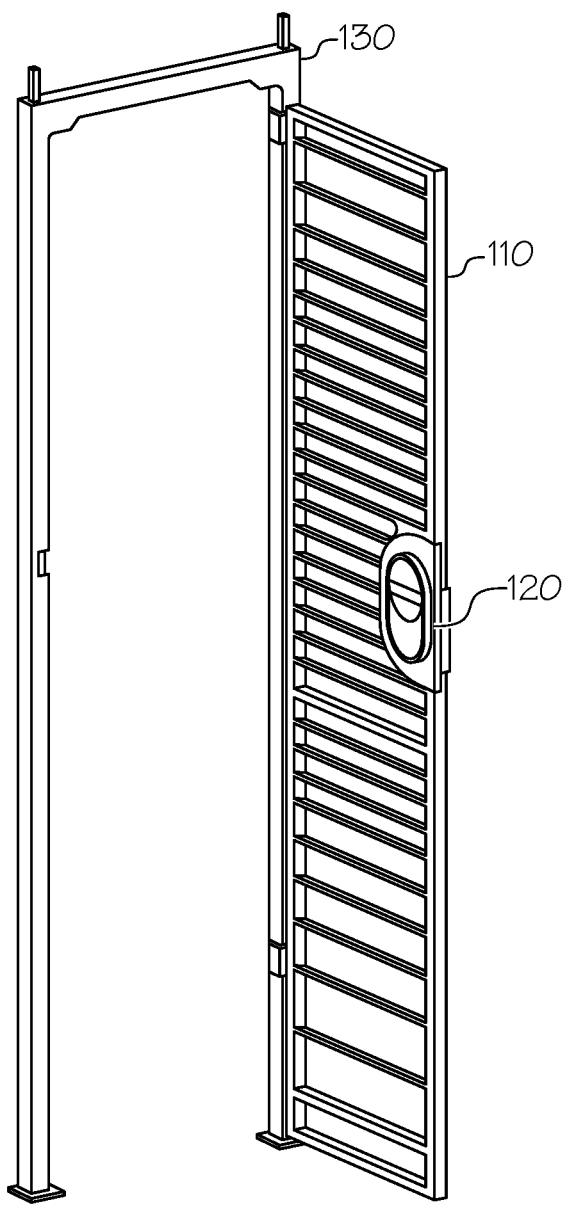
FIG. 5 is a perspective view of a flight deck barrier door in accordance an embodiment of the present disclosure, in which the flight deck barrier door includes a door frame and a door panel, in which the door panel is in an open position.
Figure 6:
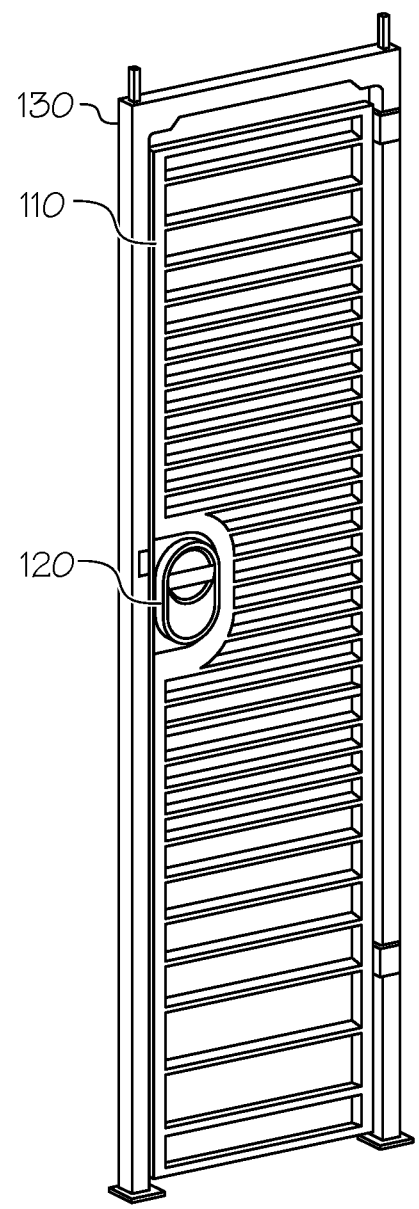
FIG. 6 is a perspective view of the flight deck barrier door of FIG. 5, in which the door panel is in a closed position.

Referring to FIGS. 5 and 6, a flight deck barrier door 100 is illustrated. The flight deck barrier door 100 includes a door panel 110, a door handle 120, and a door frame 130.

Figure 7:
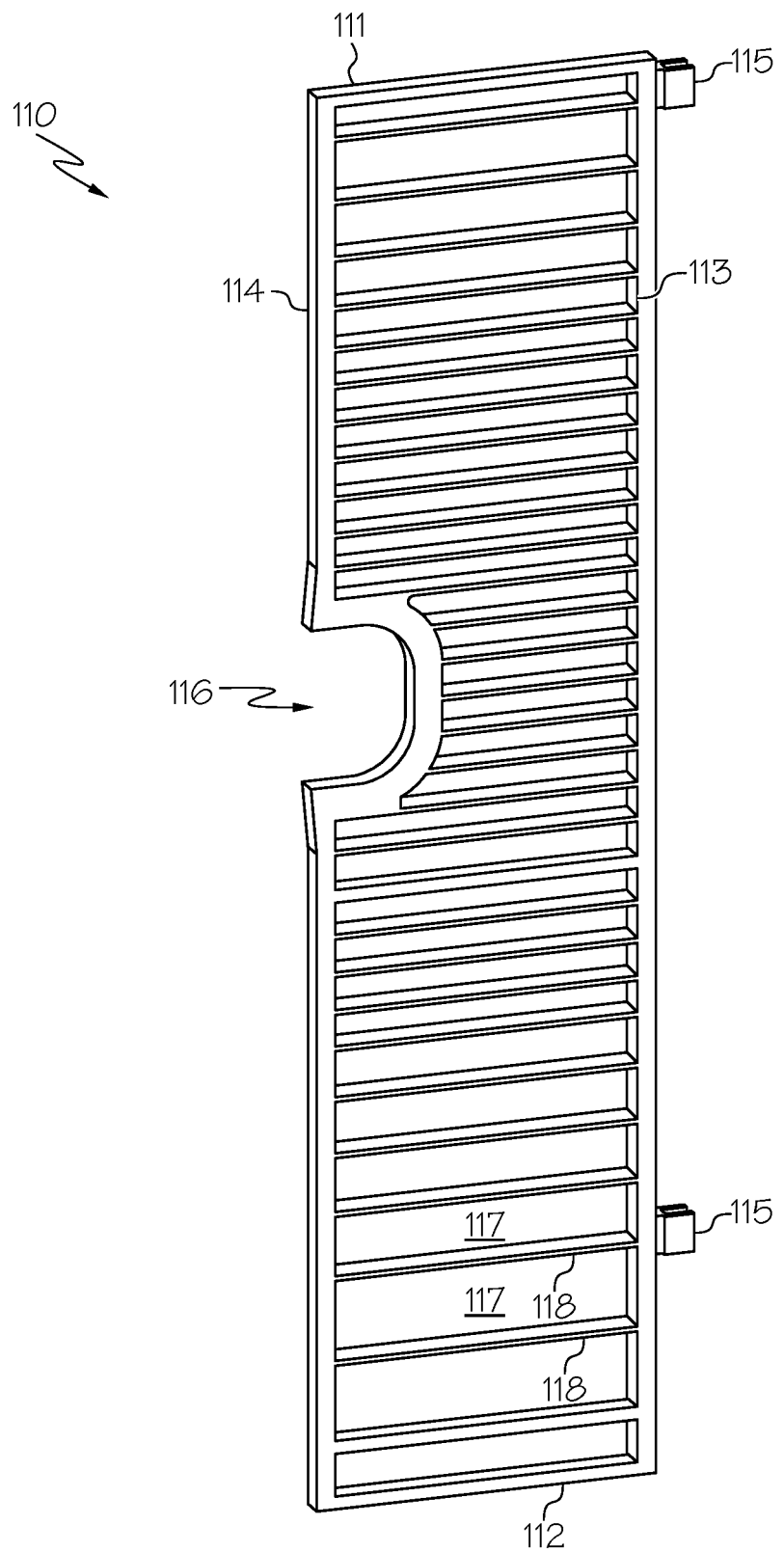
FIG. 7 is a perspective view of a door panel of a flight deck barrier door in accordance with an embodiment of the present disclosure.

Referring to FIG. 7, the door panel 110 may include an upper edge 111, a lower edge 112 opposite of the upper edge, and an inner edge 113 and an outer edge 114 opposed to each other and extending between the upper edge 111 and the lower edge 112. The outer edge 114 may include a recessed portion 116 for accommodating the door handle 120. One or more hinges 115 may be disposed at the inner edge 113. The door panel 110 may further include a plurality of vents 117, which may be defined by a plurality of slats 118 deposed between the upper edge 111, lower edge 112, inner edge 113, and outer edge 114.

The arrangement of the plurality of slats 118 is not limited. However, the arrangement of the plurality of slats 118 may affect the total vented surface area, the ability of an unauthorized person to forcibly enter the flight deck compartment 10, or the ability of an unauthorized person to access the door handle 120 through the door panel 110 from the cabin compartment 20. Referring to FIG. 7, the plurality of slats 118 extend from an inner edge 113 to an outer edge 114, which resists the ability of an unauthorized person to forcibly enter the flight deck compartment 10. Also, the number of slats 118 are increased at regions proximate to the door handle than at regions further away from the door handle to resists the ability of unauthorized persons to access the door handle 120 through the door panel 110 from the cabin compartment 20. It will be understood that the arrangement of the plurality of slats 118 may vary without departing from the scope of the present disclosure. For example, the slats 118 may be arranged, in whole or in part, to reflect a desired logo or design.

Various materials may be used to form the door panel 110. Considerations for material selection may include, but are not limited to, the strength of the material, the weight of the material and the cost of the material. In a specific, non-limiting example, the edges 111, 112, 113, 114 and slats 118 of the door panel 110 may be machined from an aluminum alloy, such as 7050-T7451. The edge and slats may be machined from approximately one inch thick aluminum alloy.

The door frame may include an inner frame portion for engaging with hinges 115 of the inner edge 113 of the door panel 110 to permit the door panel 110 to open in a swinging motion. The door frame may include an outer frame portion for engaging with door handle 120 to permit the door panel 110 to be secured in a closed position. The door frame may include an upper frame portion for connecting with a ceiling surface of the passageway 30. The door frame may include a lower frame portion for connecting a floor surface of the passageway 30. It would be understood that any of these frame portions may be included or omitted. The door frame may be integrally formed in a unitary manner or may include a plurality of separate components to be assembled into the door frame.

Figure 8:
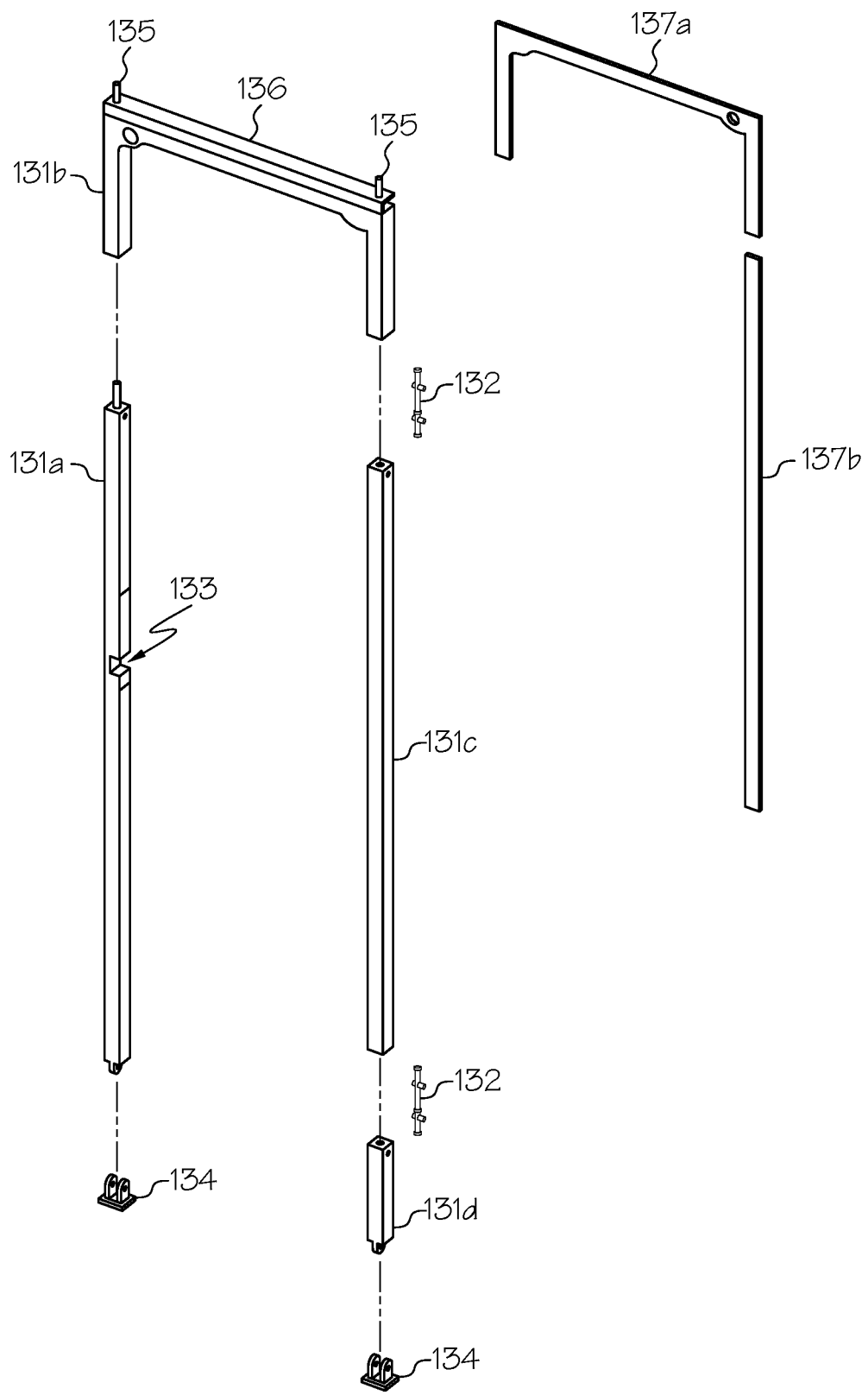
FIG. 8 is a perspective view of a door frame of a flight deck barrier door in accordance with an embodiment of the present disclosure.

Referring to FIG. 8, the illustrated embodiment of the door frame 130 includes a plurality of separate components to be assembled into a door frame 130. In particular, the plurality of separate components include first component 131a, second component 131b, third component 131c, and fourth component 131d. The first component 131a forms a portion of the outer frame portion and includes a box 133 that engages with the door handle 120 to permit the door panel 110 to be secured in a closed position. The second component 131b forms the upper frame portion for connecting to a ceiling surface of the passageway 30 and forms portions of the inner frame portion and the outer frame portion. The third component 131c and fourth component 131d each form portions of the inner frame portion, which together with hinge pins 132, permit the door panel 110 to open in a swinging motion. The illustrated embodiment in FIG. 8 does not include a lower frame portion. In a specific, non-limiting example, the door frame 130 may be a machined aluminum tube from ceiling to floor. In a non-limiting embodiment, the door frame 130 along with the door panel 110 may weight approximately 75 pounds.

Referring to FIG. 8, the door frame 130 may further includes a fixture 134 for fixedly connecting the door frame with a floor surface of the passageway 30. Although the fixture 134 is illustrated as a separate component, the fixture 134 could alternatively be integrally formed in a unitary manner with other portions of the door frame 130 or together with all portions of the door frame 130.

The door frame 130 may further include a connector 135 for connecting the door frame with a ceiling surface of the passageway, wherein the connector 135 permits for at least one degree of freedom of movement between the door frame 130 and the ceiling surface of the passageway when engaged with a channel in an adjacent surface. Although the illustrated embodiment describes fixture 134 as fixedly connecting with a floor surface and connector 135 as connecting with a ceiling surface with at least one degree of freedom of movement, the locations of the fixture 134 and connector 135 could be reversed. In yet additional embodiments, one or both of the fixture 134 and connector 135 may connect to passageway walls extending between the floor and ceiling, as previously described above.

Although connector 135 is illustrated as a slip pin, the present disclosure includes any connectors providing at least one degree of freedom of movement. In one alternative embodiment, the connector 135 may be a channel adapted to engage with a slip pin mounted on an adjacent surface, e.g., ceiling surface, of the aircraft 2, such the locations of the slip pins and channels are reversed relative to the illustrated embodiment of FIG. 8. Still referring to FIG. 8, the door frame 130 may include a retainer 136 for retaining a position of connector 135 and one or more covers, such as cover 137a and cover 137b for covering one or more surface of the door frame portions.

Figure 9:
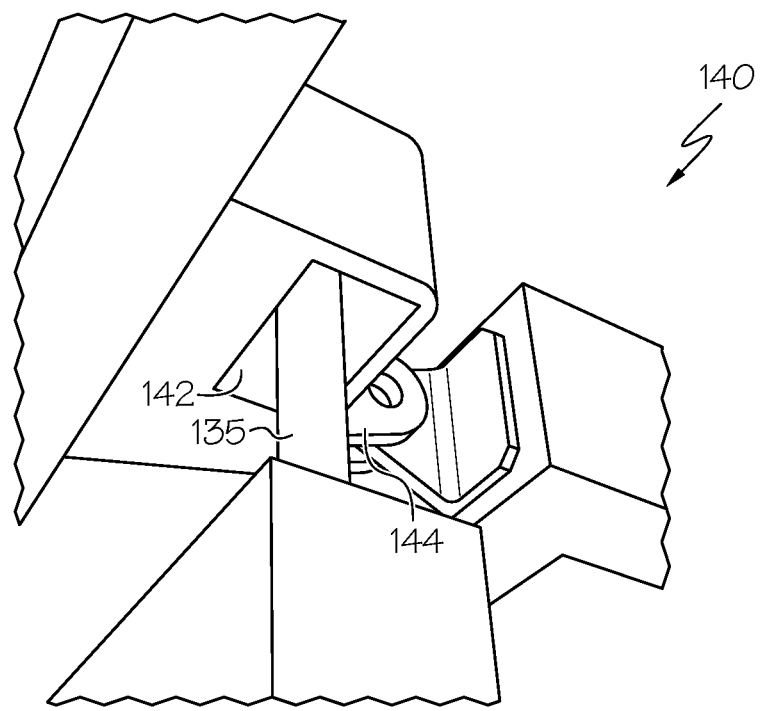
FIG. 9 is lower perspective view showing a slip pin and a housing for connecting an upper end of a door frame to an adjacent structure of the aircraft in accordance with one embodiment of the present disclosure.
Figure 10:
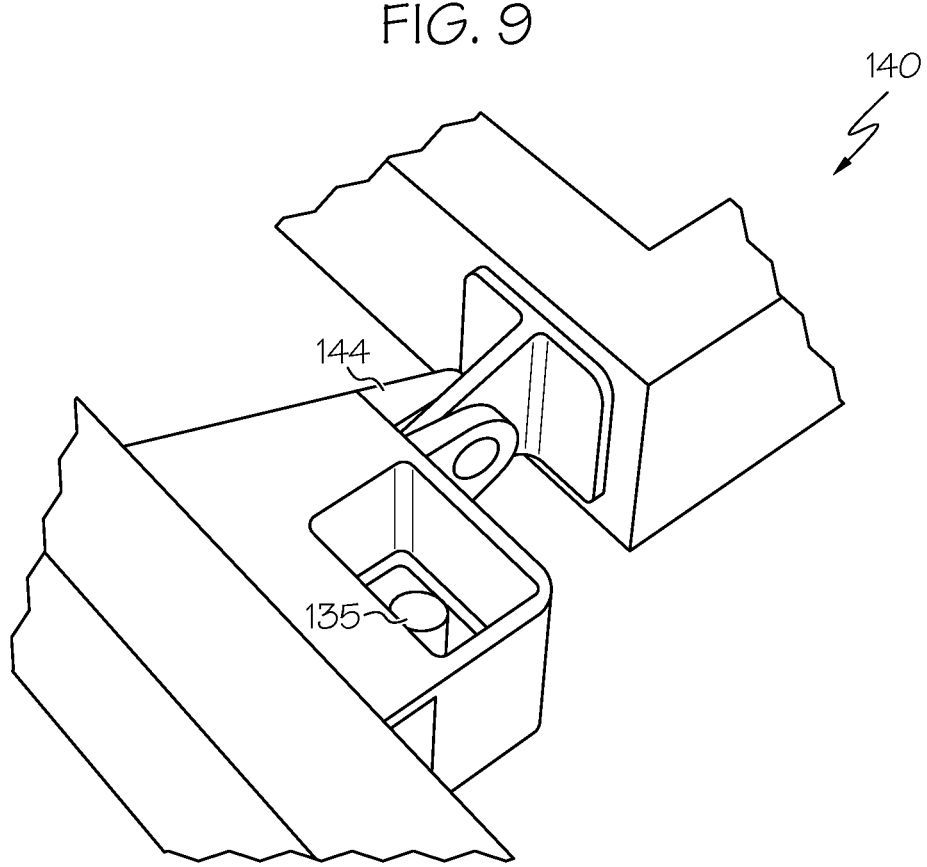
FIG. 10 is an upper perspective view showing the slip pin and the housing of FIG. 9.

Referring to FIGS. 9 and 10, the connector that providing at least one degree of freedom of movement includes multiple connectors, in which connector 135 is a slip pin and connector 140 is a housing, in which the housing includes channel 142 and clevis joint 144. In this case, the slip pin provides axial and rotational degrees of freedom between the door frame 130 and adjacent aircraft structure and channel of connector 140 engages with a slip pin and further provide clevis joint, wherein the clevis joint provides a third degree of freedom of movement between the door frame 130 and an adjacent aircraft structure.

Figure 11:
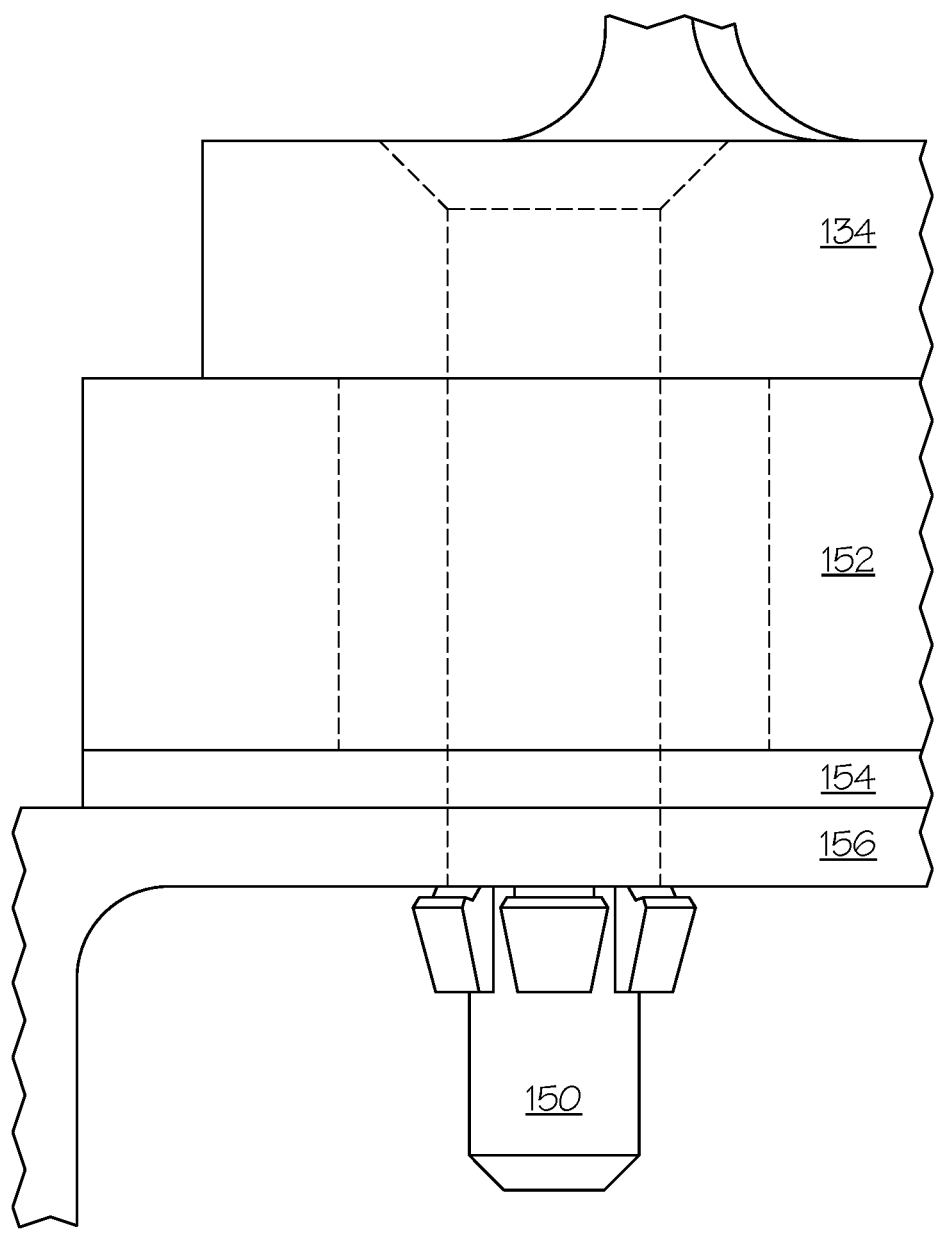
FIG. 11 is a perspective view showing a floor fixture for connecting a lower end of a door frame to an adjacent structure of the aircraft in accordance with one embodiment of the present disclosure.

FIG. 11 illustrates a fixture 134 fixedly connected to a floor of the passageway 30. As illustrated, a fastener 150 is passed through and fastened to the fixture 134, floor panel 152, nut 154, and seat track 156. However, the fixture may include any manner for fixedly connecting the door frame 130 within passageway 30.

Figure 12:
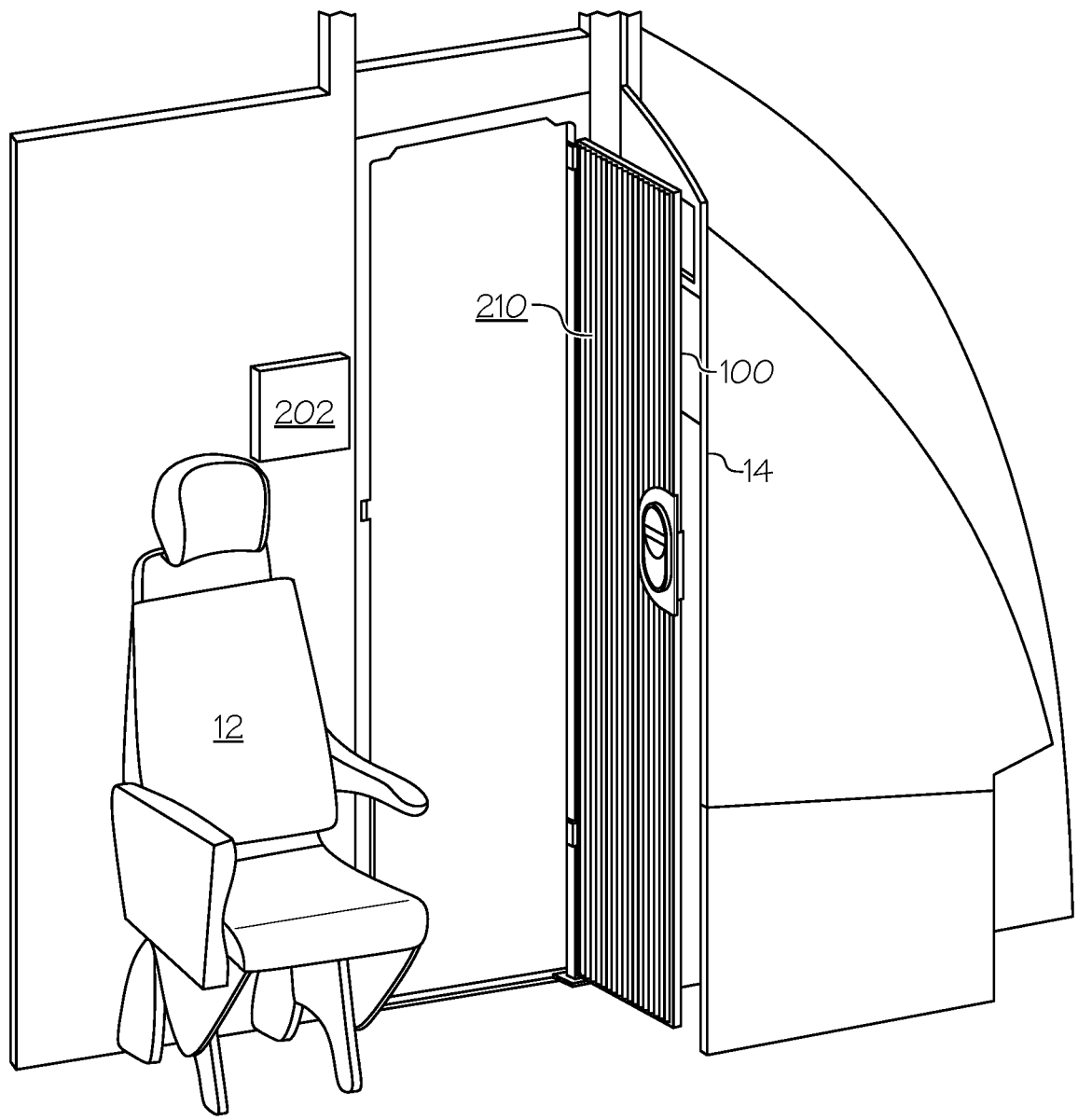
FIG. 12 is a perspective view from the flight deck compartment showing a flight deck barrier door after installation, in which a curtain is attached to a door panel of the flight deck barrier door.
Figure 13:
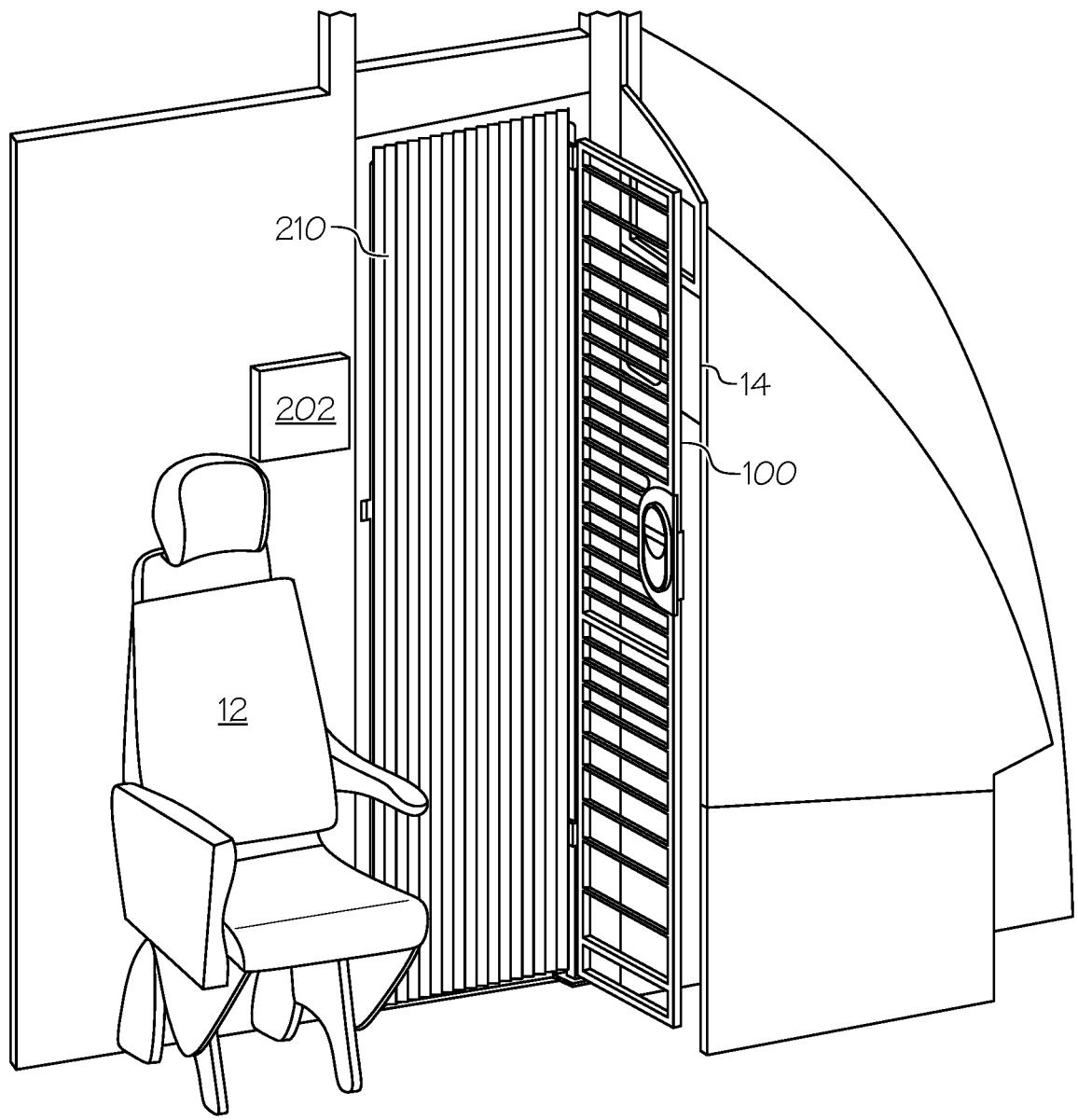
FIG. 13 is a perspective view from the flight deck compartment showing the flight deck barrier door of FIG. 12, in which a curtain is attached to a door frame of the flight deck barrier door.

Referring to FIGS. 12 and 13, a flight deck barrier door 100 after installation is shown from the perspective of the flight deck compartment, in which the flight deck barrier door 100 is shown in an open position and which a curtain 210 is included to cover the passageway 30. Referring to FIG. 12, the curtain 210 may be attached to a door panel 110 of the flight deck barrier door 100. Referring to FIG. 13, the curtain 210 may be attached to a door frame 130 of the flight deck barrier door 100. In further embodiments (not shown), the curtain 210 may be attached to a separate structure of the aircraft 2. The presence of the curtain 210 reduces potential glare and reflection from the cabin compartment 20 that could interfere with the normal duties of the flight crew.

The curtain 210 may be attached using releasable attachments. The releasable attachments may be released during a depressurization event.

Figure 14:
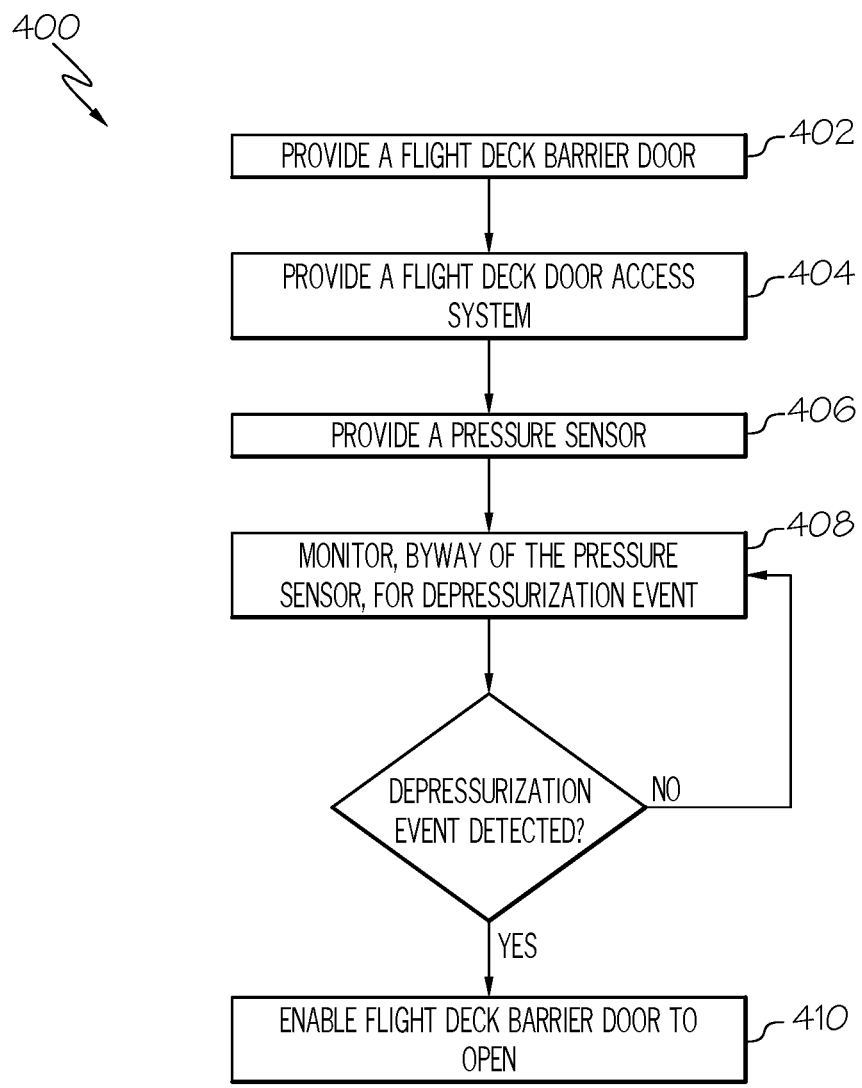
FIG. 14 is a flow diagram depicting one embodiment of the disclosed method for using a flight deck barrier door.

Referring to FIG. 14, one embodiment of the present disclosure includes a method 400 for using a flight deck barrier door 100. The method includes providing 402 a flight deck barrier door 100 to a passageway 30 between a flight deck compartment 10 and a cabin compartment 20 of an aircraft 2. The flight deck barrier door 100 has a minimum total vented surface area of 1000 square inches. The method further includes providing 404 a flight deck door access system for controlling access to opening of the flight deck barrier door 100 and providing 406 a pressure sensor 16 for detecting a depressurization event. The method further includes monitoring 408, by way of the pressure sensor 16, for a depressurization event and enabling 410, by the flight deck door access system, the flight deck barrier door 100 to open upon detecting a depressurization event.

Figure 15:
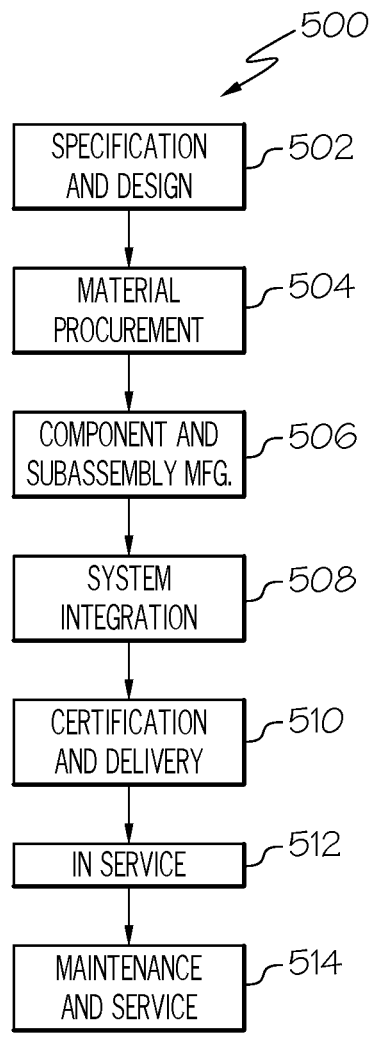
FIG. 15 is a flow diagram of an aircraft manufacturing and service methodology.
Figure 16:
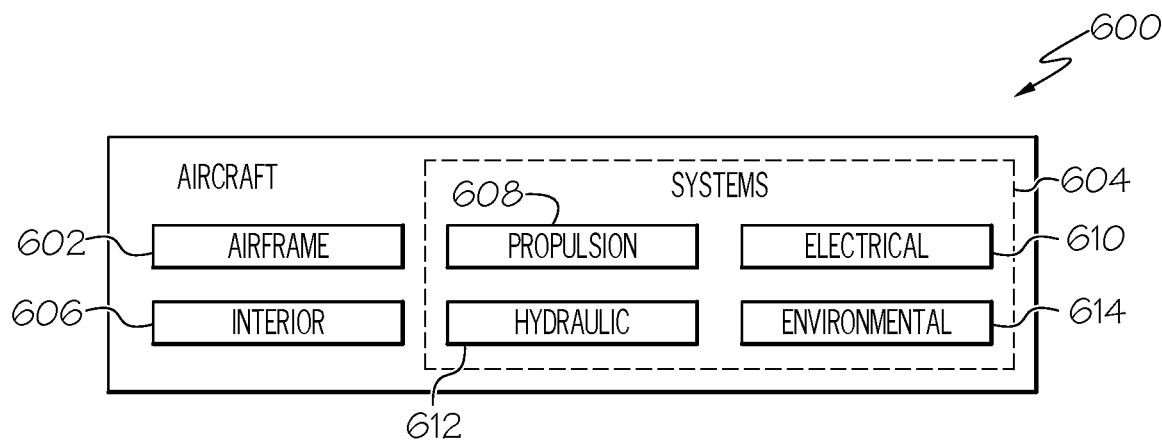
FIG. 16 is a block diagram of an aircraft.

Examples of the present disclosure may be described in the context of an aircraft manufacturing and service method 500 as shown in FIG. 15 and an aircraft 600 as shown in FIG. 16. During pre-production, the illustrative method 500 may include specification and design, as shown at block 502, of the aircraft 600 and material procurement, as shown at block 504. During production, component and subassembly manufacturing, as shown at block 506, and system integration, as shown at block 508, of the aircraft 600 may take place. Thereafter, the aircraft 600 may go through certification and delivery, as shown block 510, to be placed in service, as shown at block 512. While in service, the aircraft 600 may be scheduled for routine maintenance and service, as shown at block 514. Routine maintenance and service may include modification, reconfiguration, refurbishment, etc., of one or more systems of the aircraft 600.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 16, the aircraft 600 produced by illustrative method 500 (FIG. 15) may include airframe 602 with a plurality of high-level systems 604 and interior 606. Examples of high-level systems 604 may include one or more of propulsion system 608, electrical system 610, hydraulic system 612, and environmental system 614. Any number of other systems may be included. Although an aerospace example is shown, the principles disclosed herein may be applied to other industries, such as the automotive and marine industries. Accordingly, in addition to the aircraft 600, the principles disclosed herein may apply to other vehicles (e.g., land vehicles, marine vehicles, space vehicles, etc.).

The disclosed flight deck barrier door may be employed during any one or more of the stages of the manufacturing and service method 500. For example, the aircraft 600 may be reconfigured or refurbished during routine maintenance and service (block 514) to include the flight deck barrier door. Also, the disclosed flight deck barrier door may be utilized during production stages (blocks 506 and 508). Similarly, the disclosed flight deck barrier door may be utilized, for example and without limitation, while aircraft 600 is in service (block 512) and/or during the maintenance and service stage (block 514).

Although various embodiments of the disclosed flight deck barrier door, aircraft comprising flight deck barrier door and method for using the same have been shown and described, modifications may occur to those skilled in the art upon reading the specification. The present application includes such modifications and is limited only by the scope of the claims.

What is claimed is:

1. A flight deck barrier door, comprising:
   a door frame having an inner frame portion and an outer frame portion; and
   a door panel in the door frame, the door panel comprising:
      a one piece body defining an upper edge, a lower edge, an inner edge, and an outer edge of the door panel and defining a plurality of slats defining a plurality of vents, the outer edge including an inwardly recessed portion; and
      a door handle positioned in the inwardly recessed portion,
      wherein the inner frame portion of the door frame is hingedly connected to the inner edge of the door panel, wherein the outer frame portion of the door frame engages with the door handle, and
   wherein the flight deck barrier door has a minimum total vented surface area of 1000 square inches.

2. The flight deck barrier door of claim 1, wherein the flight deck barrier door has a minimum total vented surface area of 1200 square inches.

3. The flight deck barrier door of claim 1, wherein the flight deck barrier door has a total vented surface area of between 1200 to 1500 square inches.

4. The flight deck barrier door of claim 1, wherein the flight deck barrier door has a total vented surface area of between 1200 to 1400 square inches.

5. The flight deck barrier door of claim 1, wherein a number of the slats defining the plurality of vents is higher at regions proximate to the door handle than at regions further away from the door handle.

6. The flight deck barrier door of claim 1, wherein a width of the slats defining the plurality of vents is higher at regions proximate to the door handle than at regions further away from the door handle.

7. An aircraft, comprising:
   a flight deck compartment;
   a cabin compartment aft of the flight deck compartment;
   a passageway for passing between the flight deck compartment and the cabin compartment; and
   a flight deck barrier door in the passageway, the flight deck barrier door comprising:
      a door frame having an inner frame portion and an outer frame portion, wherein only one end of the door frame is fixedly connected to the passageway;
      a door panel in the door frame, the door panel having a plurality of vents,
      wherein the flight deck barrier door has a minimum total vented surface area of 1000 square inches.

8. The aircraft of claim 7, wherein the door frame is connected to the passageway at another end of the door frame by a connection that permits at least one degree of freedom of movement.

9. The aircraft of claim 7, further comprising a flight deck door access system for controlling access to opening of the flight deck barrier door.

10. The aircraft of claim 9, further comprising a pressure sensor for detecting a depressurization event, wherein the flight deck door access system enables the flight deck barrier door to open upon detecting the depressurization event.

11. The aircraft of claim 7, wherein the flight deck barrier door has a minimum total vented surface area of 1200 square inches.

12. The aircraft of claim 7, wherein the flight deck barrier door has a total vented surface area of between 1200 to 1500 square inches.

13. The aircraft of claim 7, wherein the door panel comprises:
- a one piece body defining an upper edge, a lower edge, an inner edge, and an outer edge of the door panel and defining a plurality of slats defining the plurality of vents, the outer edge including an inwardly recessed portion; and
- a door handle positioned in the inwardly recessed portion, wherein the inner frame portion of the door frame is hingedly connected to the inner edge of the door panel, and wherein the outer frame portion engages with the door handle.

14. The aircraft of claim 13, wherein a number of the slats defining the plurality of vents is higher at regions proximate to the door handle than at regions further away from the door handle.

15. The aircraft of claim 13, wherein a width of the slats defining the plurality of vents is higher at regions proximate to the door handle than at regions further away from the door handle.

16. The aircraft of claim 13, wherein a length of the slats defining the plurality of vents is lower at regions proximate to the door handle than at regions further away from the door handle.

17. The aircraft of claim 13, wherein each slat extends from a first major surface of the door panel to a second major surface of the door panel such that first sides of the plurality of slats are positioned at the first major surface of the door panel and second sides of the plurality of slats are positioned at the second major surface of the door panel.

18. The aircraft of claim 13, wherein the door frame comprises a plurality of separate components connected together, including:
- a first frame component that forms a portion of the outer frame portion and includes a box that engages with the door handle;
- a second component that forms an upper frame portion for connecting to a ceiling surface of the passageway and that forms portions of the inner frame portion and the outer frame portion; and
- a third component and fourth component that each form portions of the inner frame portion, which together with hinge pins, permit the door panel to open in a swinging motion.

19. The aircraft of claim 7, wherein the door frame comprises a machined aluminum tube.

20. A method for using the flight deck barrier door of claim 1 to a passageway between a flight deck compartment and a cabin compartment of an aircraft, the method comprising:
- providing the flight deck barrier door of claim 1 to the passageway between the flight deck compartment and the cabin compartment of the aircraft;
- monitoring, by way of a pressure sensor, for a depressurization event; and
- enabling the flight deck barrier door to open when said depressurization event is detected.

* * * * *